United States Patent
Wang et al.

(10) Patent No.: US 9,502,150 B2
(45) Date of Patent: Nov. 22, 2016

(54) GRAPHENE OXIDE POLYMER WITH NONLINEAR RESISTIVITY

(75) Inventors: Zepu Wang, Albany, NY (US); Linda S. Schadler, Niskayuna, NY (US); Henrik Hillborg, Vasteras (SE); Su Zhao, Vasteras (SE)

(73) Assignees: Rensselaer Polytechnic Institute, Troy, NY (US); ABB AB, Vasteras (SE)

( * ) Notice: Subject to any disclaimer, the term of this patent is extended or adjusted under 35 U.S.C. 154(b) by 108 days.

(21) Appl. No.: 14/241,658

(22) PCT Filed: Aug. 31, 2012

(86) PCT No.: PCT/US2012/053455
§ 371 (c)(1),
(2), (4) Date: Feb. 27, 2014

(87) PCT Pub. No.: WO2013/033603
PCT Pub. Date: Mar. 7, 2013

(65) Prior Publication Data
US 2015/0001448 A1    Jan. 1, 2015

Related U.S. Application Data

(60) Provisional application No. 61/573,209, filed on Sep. 1, 2011, provisional application No. 61/546,636, filed on Oct. 13, 2011.

(51) Int. Cl.
*C01B 31/04* (2006.01)
*H01B 1/12* (2006.01)
(Continued)

(52) U.S. Cl.
CPC .............. *H01B 1/125* (2013.01); *B82Y 30/00* (2013.01); *B82Y 40/00* (2013.01); *C01B 31/043* (2013.01); *C01B 31/0476* (2013.01); *H01B 1/04* (2013.01); *H01B 1/124* (2013.01); *H01B 3/004* (2013.01)

(58) Field of Classification Search
CPC ........ H01B 1/125; H01B 1/04; H01B 1/124; H01B 3/004; B82Y 30/00; B82Y 40/00; C01B 31/0043; C01B 31/0476

USPC ........................................................ 252/500
See application file for complete search history.

(56) References Cited

U.S. PATENT DOCUMENTS

| | | | |
|---|---|---|---|
| 7,868,079 B2 | 1/2011 | Onneby et al. | |
| 2007/0199729 A1* | 8/2007 | Siegel | C08K 3/22 174/73.1 |
| 2009/0301169 A1* | 12/2009 | Higgins | C09D 183/16 73/23.2 |
| 2010/0139974 A1 | 6/2010 | Christen | |
| 2011/0180140 A1* | 7/2011 | Zhai | B82Y 10/00 136/256 |

FOREIGN PATENT DOCUMENTS

| | | |
|---|---|---|
| EP | 2337070 A1 | 6/2011 |
| WO | 2008076058 A1 | 6/2008 |

(Continued)

OTHER PUBLICATIONS

Wang et al., "Electrically conductive and mechanically strong biomimetic chitosan/reduced graphene oxide composite films," Journal of Materials Chemistry. 20:9032-6 (2010).

(Continued)

*Primary Examiner* — Mark Kopec
*Assistant Examiner* — Danny N Kang
(74) *Attorney, Agent, or Firm* — Hoffman Warnick LLC

(57) ABSTRACT

The invention relates generally to field grading materials and, more particularly, to field grading materials including graphene oxide, reduced graphene oxide, or both, exhibiting non-linear resistivity. In one embodiment, the invention provides a composite material comprising: a polymer material; and reduced graphene oxide distributed within the polymer material.

12 Claims, 7 Drawing Sheets

(51) Int. Cl.
*H01B 1/04* (2006.01)
*H01B 3/00* (2006.01)
*B82Y 30/00* (2011.01)
*B82Y 40/00* (2011.01)

(56) References Cited

FOREIGN PATENT DOCUMENTS

| WO | WO 2010074918 A1 * | 7/2010 |
| WO | 2011082064 A1 | 7/2011 |
| WO | 2012112435 A1 | 8/2012 |

OTHER PUBLICATIONS

Extended European Search Report for European Patent Application No. 12828277.9, dated Jun. 8, 2015, 9 pages.

Notification of the First Office Action for Chinese Patent Application No. 201280050129.2, dated Aug. 5, 2015, 18 pages. English language translation provided.

Patent Cooperation Treaty, The International Search Report and the Written Opinion of the International Searching Authority, or the Declaration for PCT/US2012/053455 dated Jan. 23, 2013, 10 pages.

* cited by examiner

GRAPHENE OXIDE POLYMER WITH NONLINEAR RESISTIVITY

CROSS-REFERENCE TO RELATED APPLICATIONS

This application claims the benefit of U.S. provisional patent application Nos. 61/573,209, filed 1 Sep. 2011 and 61/546,636, filed 13 Oct. 2011, each of which is incorporated herein.

BACKGROUND

The interconnection of electrical cables or the termination of an electrical cable requires removal of the cable shield along some portion of the cable length. Removal of the shield induces electrical stresses along the cable axis.

Such stresses are typically reduced by applying a field grading material to the interconnection or termination. Capacitive field grading materials are employed in alternating current (AC) applications, while resistive field grading materials may be employed in AC or direct current (DC) applications.

When a resistive field grading material is applied to an unshielded portion of the cable and adjacent the remaining shield, a positive voltage applied to the cable induces a resistive voltage drop in the field grading material, which distributes the potential more uniformly. This distribution is more uniform if the resistance or conductivity of the field grading material itself is non-linear.

Known field grading materials typically comprise semi-conducting ceramic particles, such as silicon carbide (SiC) or zinc oxide (ZnO) and carbon black admixed in a polymer material. Achieving non-linear conductivity in such materials typically requires high loading (e.g., 30% to 40% by volume) of these particles within the polymer. As a result, however, the field grading materials tend to suffer from poor mechanical properties (e.g., brittleness), have a relatively high weight, and a tendency to overheat at high electrical fields.

SUMMARY

In one embodiment, the invention provides a composite material comprising: a polymer material; and reduced graphene oxide distributed within the polymer material. In some embodiments of the invention, the reduced graphene oxide is present at a concentration between about 2 parts per hundred parts of the polymer material and about 10 parts per hundred parts of the polymer material.

In another embodiment, the invention provides a method of reducing electric field stress at a joint or termination of an electric cable, the method comprising: applying to the joint or termination a field grading material, the field grading material comprising reduced graphene oxide distributed within a polymer material.

In still another embodiment, the invention provides a method of preparing a composite material, the method comprising: thermally reducing a quantity of graphene oxide by increasing an ambient temperature of an atmosphere containing the quantity of graphene oxide to between about 70° C. and about 160° C.; admixing the thermally-reduced quantity of graphene oxide with at least one polymer material; and curing the admixture.

In another embodiment, the graphene oxide is thermally reduced at a temperature of between about 100° C. and about 150° C.

In yet still another embodiment, the invention provides a field grading material exhibiting non-linear resistivity comprising a quantity of graphene oxide, reduced graphene oxide, or both, distributed within at least one polymer material. In some such embodiments, the field grading material includes reduced graphene oxide.

In yet still another embodiment, the invention provides a composite material comprising: a polymer material; and a quantity of graphene oxide.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

Figure 1:
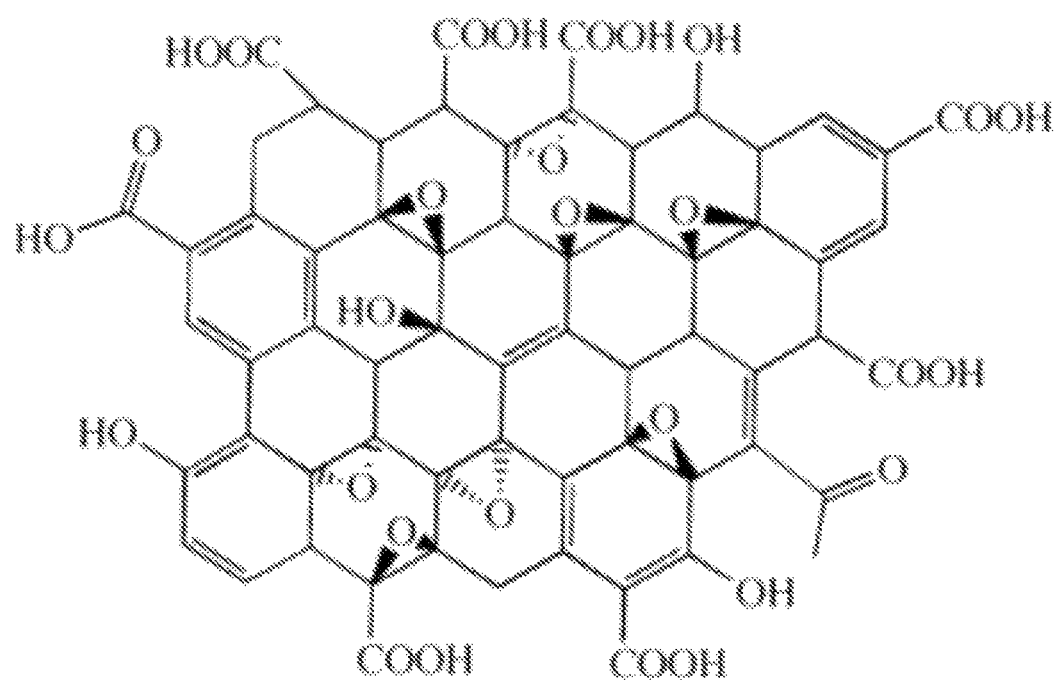
FIG. 1 shows the chemical structure of graphene oxide.

Graphene oxide (GO) is a single carbon layer graphite with abundant surface groups (epoxy, hydroxyl, carboxyl, and carbonyl). Its chemical structure is shown in FIG. 1.

Figure 2:
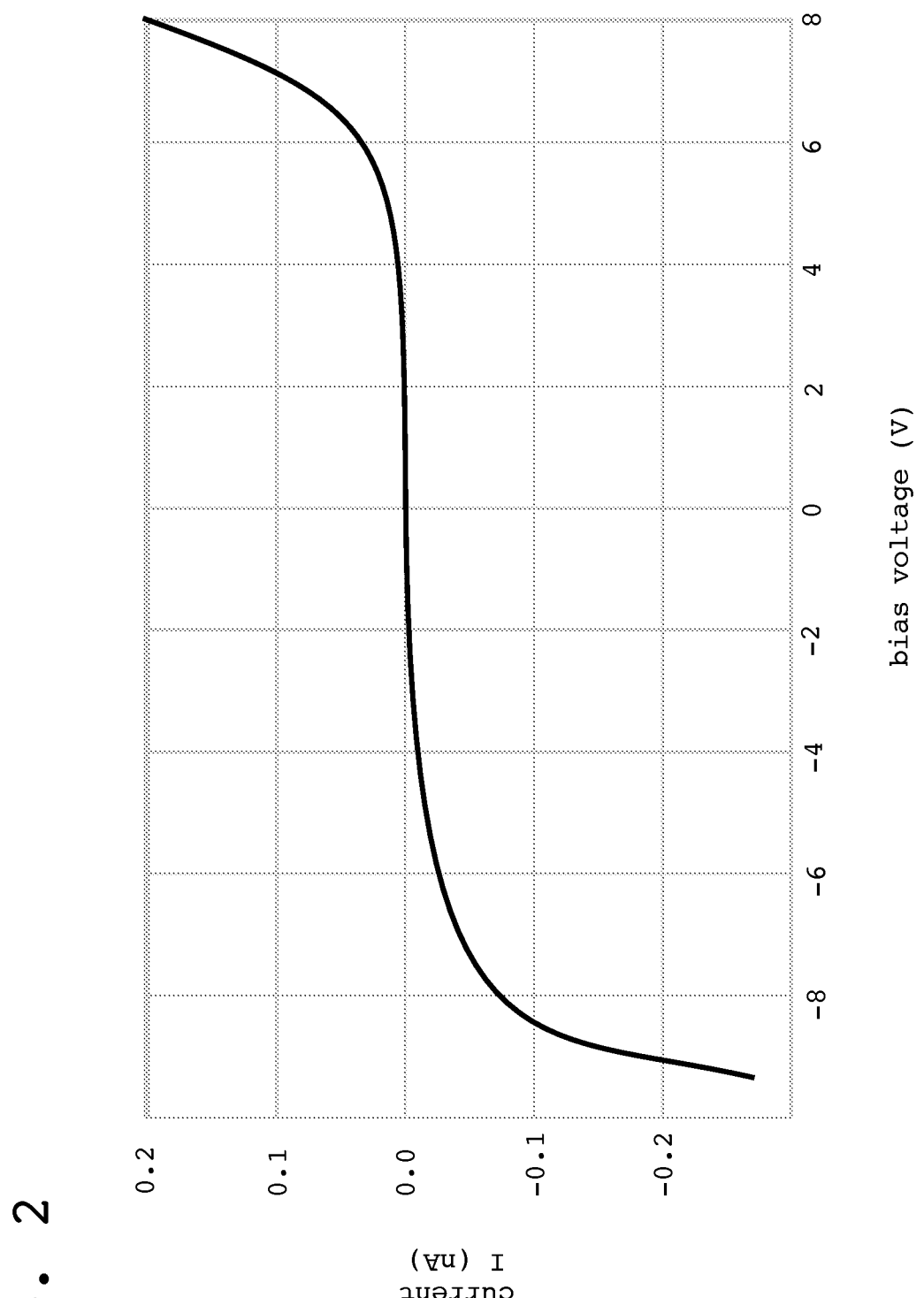
FIG. 2 shows a plot of the non-linear resistivity/conductivity of graphene oxide.

GO shows a non-linear current-voltage characteristic, attributable, at least in part, to its abundant surface groups. FIG. 2 shows the non-linear properties of GO, with current plotted as a function of bias voltage. As can be seen, with low electrical fields, conductivity is low and resistivity is correspondingly high. As voltage increases, however, and the energy barrier of the surface groups is surpassed, large currents can be induced, resulting in a much higher composite conductivity and a correspondingly low resistivity.

Reduction of the GO allows control of its non-linear resistivity. GO may be reduced by various chemical or thermal techniques, which are known.

Figure 3:
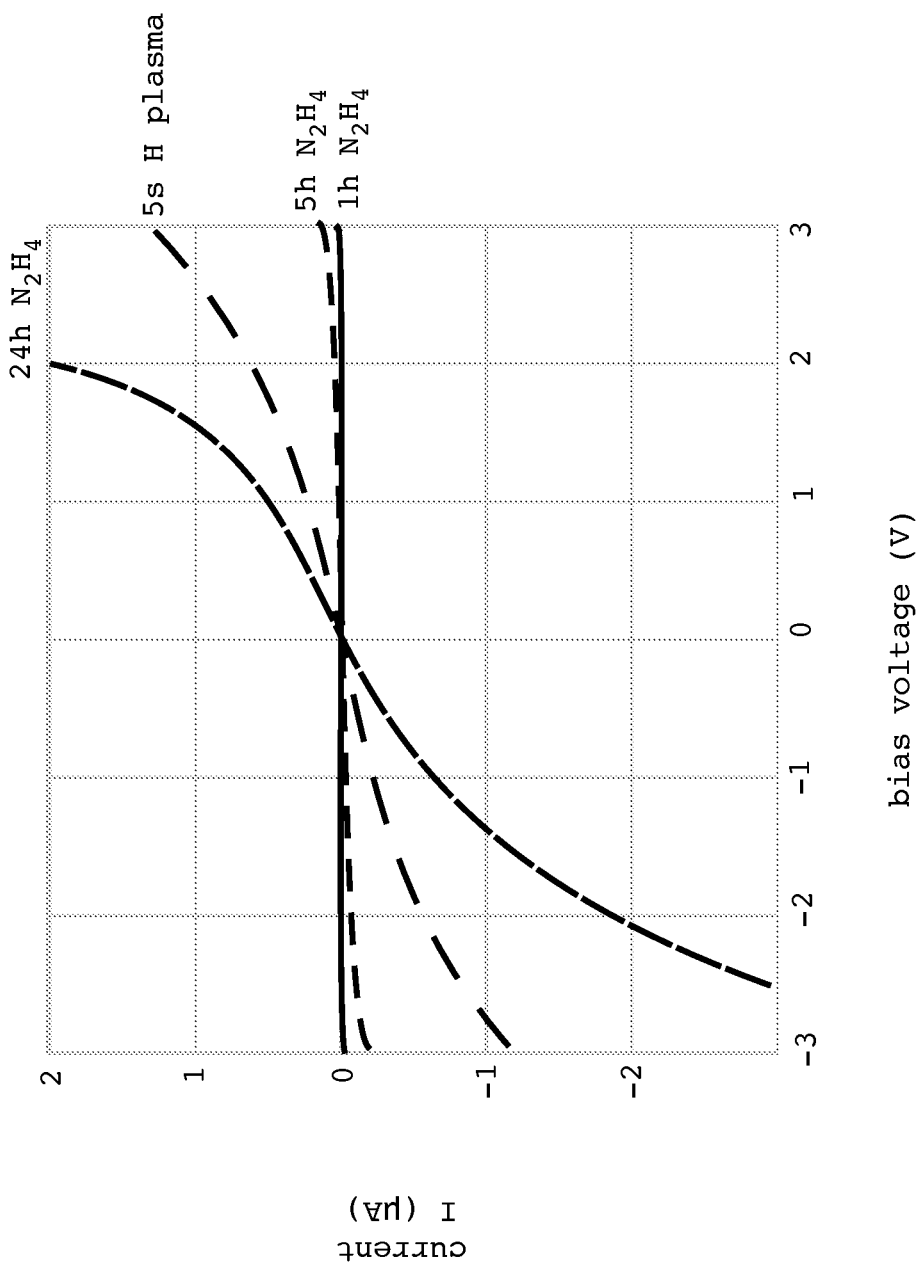
FIG. 3 shows a plot of the non-linear resistivities/conductivities of variously reduced graphene oxide species.

FIG. 3 shows a plot of the conductivities of various reduced species of GO. As can be seen in FIG. 3, increasing the duration of reduction by hydrazine ($N_2H_4$) between one hour and 24 hours reduces the switching field of the non-linear behavior of the reduced GO. Brief (5 s) exposure to hydrogen plasma increased non-linear resistivity to that intermediate five-hour and 24-hour hydrazine exposure.

Material Preparation

According to one embodiment of the invention, a commercially-available GO suspension comprising primarily single-layer GO dispersed in water was freeze dried at room temperature with a pressure below about 100 mTorr. Separated GO was then collected in a foam structure and subjected to thermal reduction by gradually increasing the ambient temperature to between about 100° C. and about 120° C. and held for 12 hours. The final temperature was varied to control the extent of reduction of the GO. GO was also subjected to thermal reduction by gradually increasing the ambient temperature to between about 100° C. and about 150° C. and held for 12 hours.

Reduced GO was then mixed with a resin, poly(dimethyl siloxane) (PDMS), available as a silicon rubber kit (Dow Corning's Slygard 184), and cured in a mold to prepare planar samples for analysis. One of ordinary skill in the art will recognize, of course, that other polymer materials may be used. Suitable polymer materials include, but are not limited to, natural rubbers, silicone (such as poly(dimethyl siloxane)), EPDM rubber (ethylene propylene diene rubber), EPR (ethylene propylene rubber), epoxy, polyester, polyesterimide, and PAI (polyamidimide).

It should be understood, of course, that composite materials including reduced GO, according to various embodiments of the invention, may also include unreduced GO. In such embodiments, the inclusion of unreduced GO may be deliberate, in order to tailor the properties of the composite material, or may simply be a consequence of the reduction method employed. In any case, embodiments of the invention including reduced GO should not be viewed as expressly excluding the presence of unreduced GO.

Material Analyses

Planar samples of the prepared materials were analyzed using dielectric spectroscopy and electrical conductivity tests.

Figure 4:
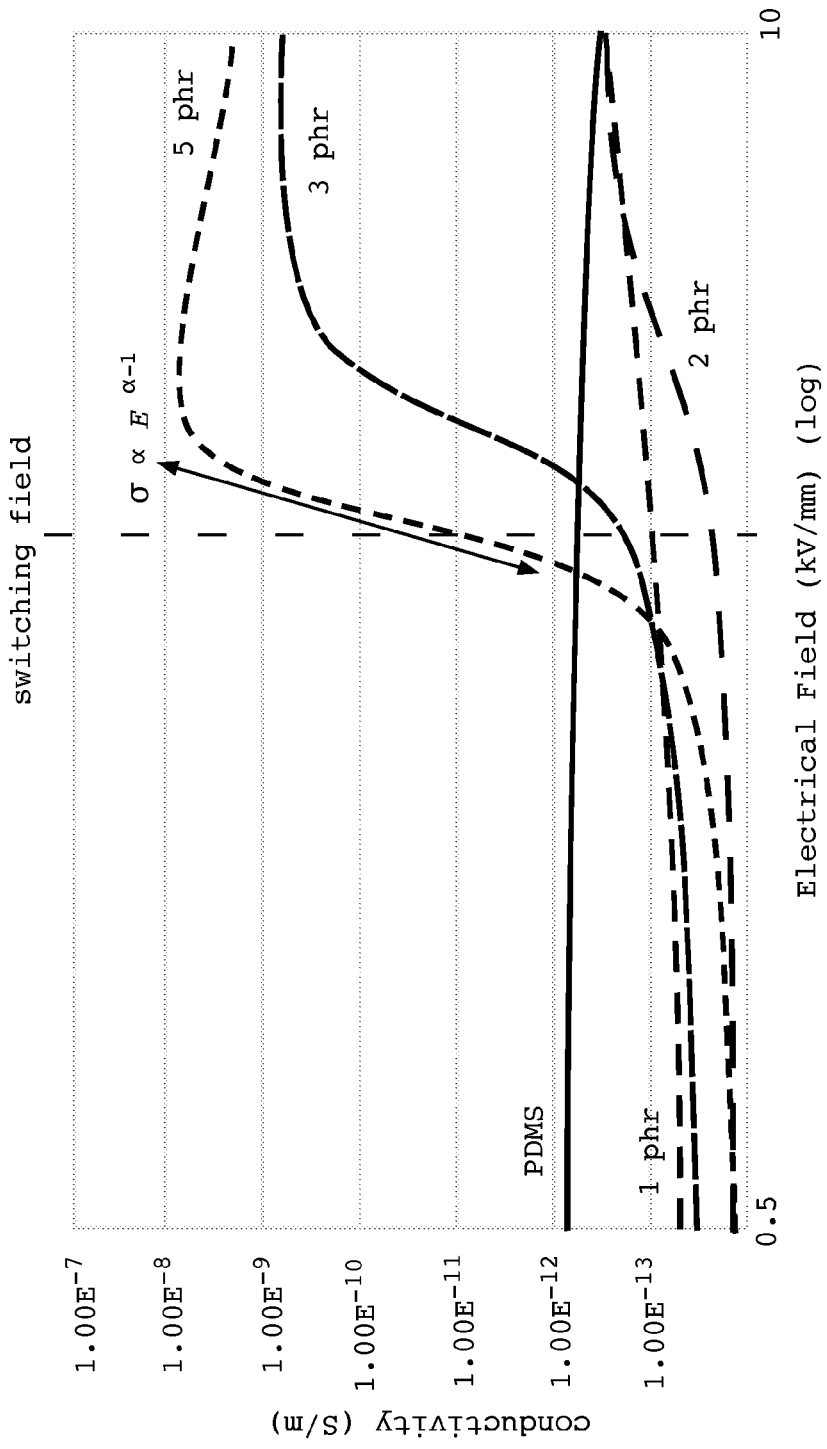
FIGS. 4 and 5 show plots of the conductivities of reduced graphene oxide composites according to various embodiments of the invention.

FIG. 4 shows a plot of conductivity as a function of electrical field strength for several of the prepared composite materials, as well as for the neat PDMS. Each of the composite materials comprises PDMS admixed with a quantity of GO thermally-reduced at 120°C. for 12 hours. As can be seen in FIG. 4, the neat PDMS exhibits a gradual decrease in conductivity as the electrical field strength increases. The prepared composite materials, however, show a reduction in conductivity at low electrical fields, followed by increases in conductivity with increasing electrical field strength. These increases are more marked with an increasing load of reduced GO and, at high loads, indicate percolation and an eventual saturation of conductivity.

For example, the composite material having 1 part reduced GO per hundred parts resin (phr) shows a conductivity less than that of the neat PDMS at low field strengths, followed by a gradual increase in conductivity, with a maximum conductivity about equal to that of the neat PDMS.

The composite material having 2 phr reduced GO shows a conductivity at low field strengths that is less than that of the 1 phr material, with a gradual but more rapid increase in conductivity that reaches a maximum about equal to that of the neat PDMS and the 1 phr composite material.

A dramatic and unexpected change in conductivity can be seen in composite materials having 3 phr or greater reduced GO. Again, conductivity of the 3 phr composite material is less than that of the neat PDMS at low field strengths and increases with increasing field strength. However, the increase in conductivity is non-linear, with conductivity exceeding and saturating above that of the neat PDMS.

The conductivity of the 5 phr composite material increases even more dramatically than that of the 3 phr material. As can be seen in FIG. 4, the higher loading of reduced GO in the 5 phr composite results in a higher total conductivity and a transition to a non-linear conductivity increase at a lower field strength than is seen for the 3 phr composite.

The non-linear portion of the 5 phr composite plot may be described generally with reference to the switching field shown in FIG. 4. The non-linear coefficient a can be calculated by fitting the transition portion of the conductivity plot according to the equation $\sigma \propto E^{\alpha-1}$, where $\sigma$ is the conductivity and E is the electrical field. In the non-linear region of the 5 phr composite, $\alpha$ has a value of about 16, which is quite large in most field grading applications.

In the case of both the 3 phr composite and the 5 phr composite, conductivity saturated at about $1.00E^{-9}$ S/m. That is, further increase in field strength did not result in an increase in conductivity beyond the saturation point. This is unusual and unexpected, as conductivity continues to increase at higher electric fields in known non-linear polymer composites.

The unusual conductive properties of the field grading materials of the invention may be attributable to the abundant surface groups of GO, which lead to disrupted $sp^2$ bonding orbitals and act as energy barriers for charge transport along the carbon network. Electrons are blocked by these energy barriers at low electric fields, but are capable of tunneling through them at high electrical fields. Thus, electronic conduction along the GO network is facilitated at high electric fields and becomes the major contributor to the total current.

The percolation threshold, the volume fraction of the GO at which a conduct path is formed throughout the composite, for the composite materials in FIG. 4 is between the 2 phr composite and the 3 phr composite. Once the percolation threshold is reached, additional increases in the proportion of reduced GO do not result in dramatic changes in the high field conductivity, although the non-linear transition does occur at a lower field strength, as noted above. In addition, the conductivity saturation following non-linear transition suggests that most of the conduction paths along the GO network are "switched on" and that the maximum current is limited by electron transport along the GO network.

Figure 5:
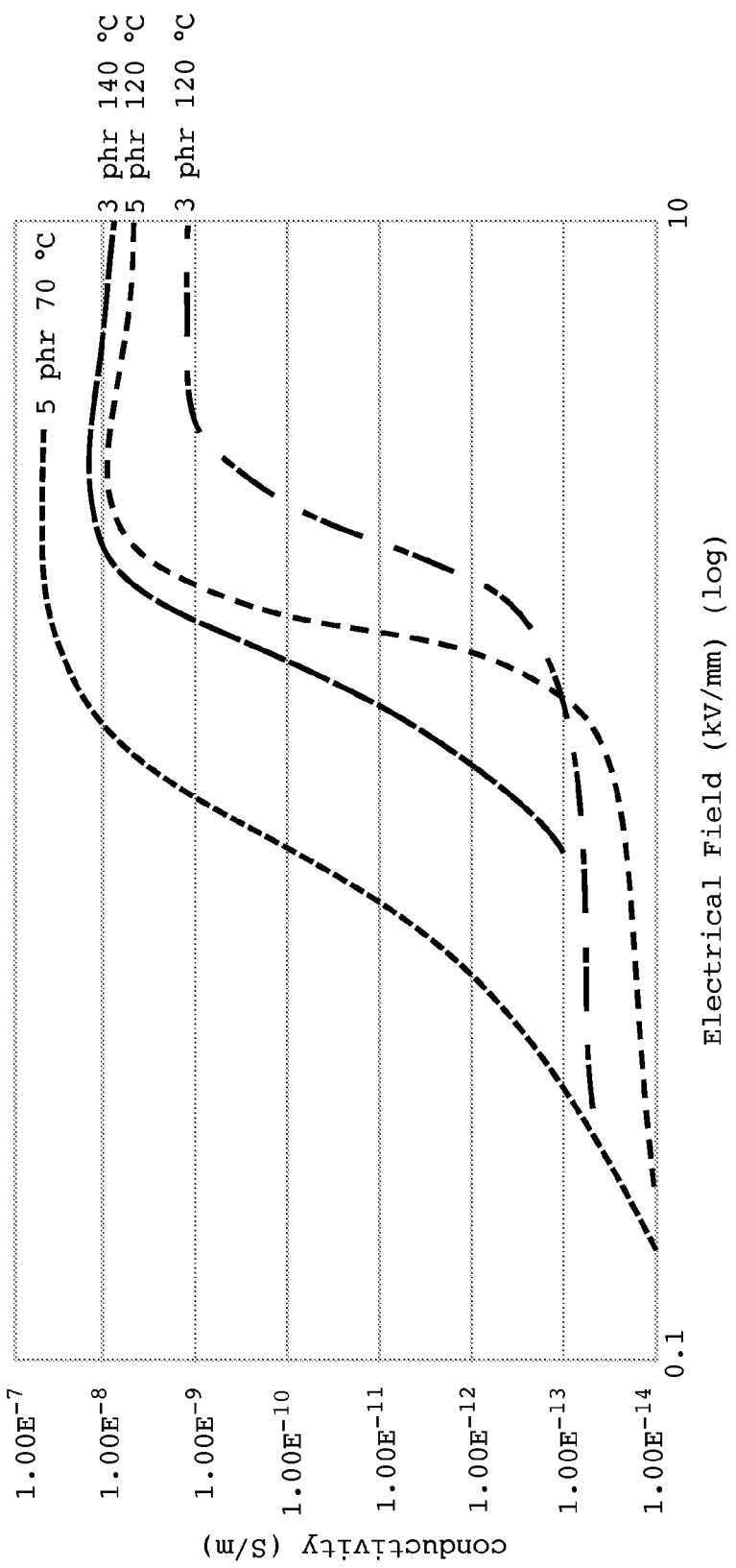

FIG. 5 shows the conductivity plots of several composite materials, the properties of which have been tailored by controlling their GO oxidation states. Each energy barrier, from either the GO surface groups or the contact between GO platelets, possesses a characteristic voltage above which electrons can tunnel through. The total switching voltage of a composite is equal to the sum of those characteristic voltages. Accordingly, by adjusting the oxidation state of a GO sample, one can affect the energy barriers from surface groups and tailor the total switching voltage.

For example, by increasing the reduction temperature from 120°C. to 140°C., the switching field of the two 3 phr composite materials in FIG. 5 is shifted from about 4 kV/mm to about 2 kV/mm. This may be attributed to a reduced number of oxidized surface groups and a proportional number of energy barriers.

The point at which conductivity becomes saturated can also be controlled by tuning the oxidation state of the GO. In general, the conductivity of a percolated composite GO material can be described according to the equation:

$$\sigma = \sigma_f (f - f_c)^t,$$

wherein $\sigma_f$ is the conductivity of the GO, f and $f_c$ are, respectively, the actual and critical GO volume fractions, and t is the critical exponent.

Because the conductivity of GO increases when reduced at a higher temperature, the saturated current also increases by about an order of magnitude for the 3 phr 140° C. composite. Unexpectedly, the 5 phr 70° C. composite exhibited a lower switching field and higher conductivity saturation point than the 5 phr 120° C. This may be attributed to the rearrangement of functional groups on the GO surface during thermal reduction. Prior to thermal reduction, surface groups are distributed randomly across the GO surface. During thermal reduction, however, epoxy groups tend to line up to reduce strain of the graphene sheet. These linearly arranged surface groups are more efficient energy barriers against electron transport than are randomly distributed surface groups. Continued reduction then causes intensive detachment of the epoxy groups and other surface groups, resulting in the decreased switching voltage.

Figure 6:
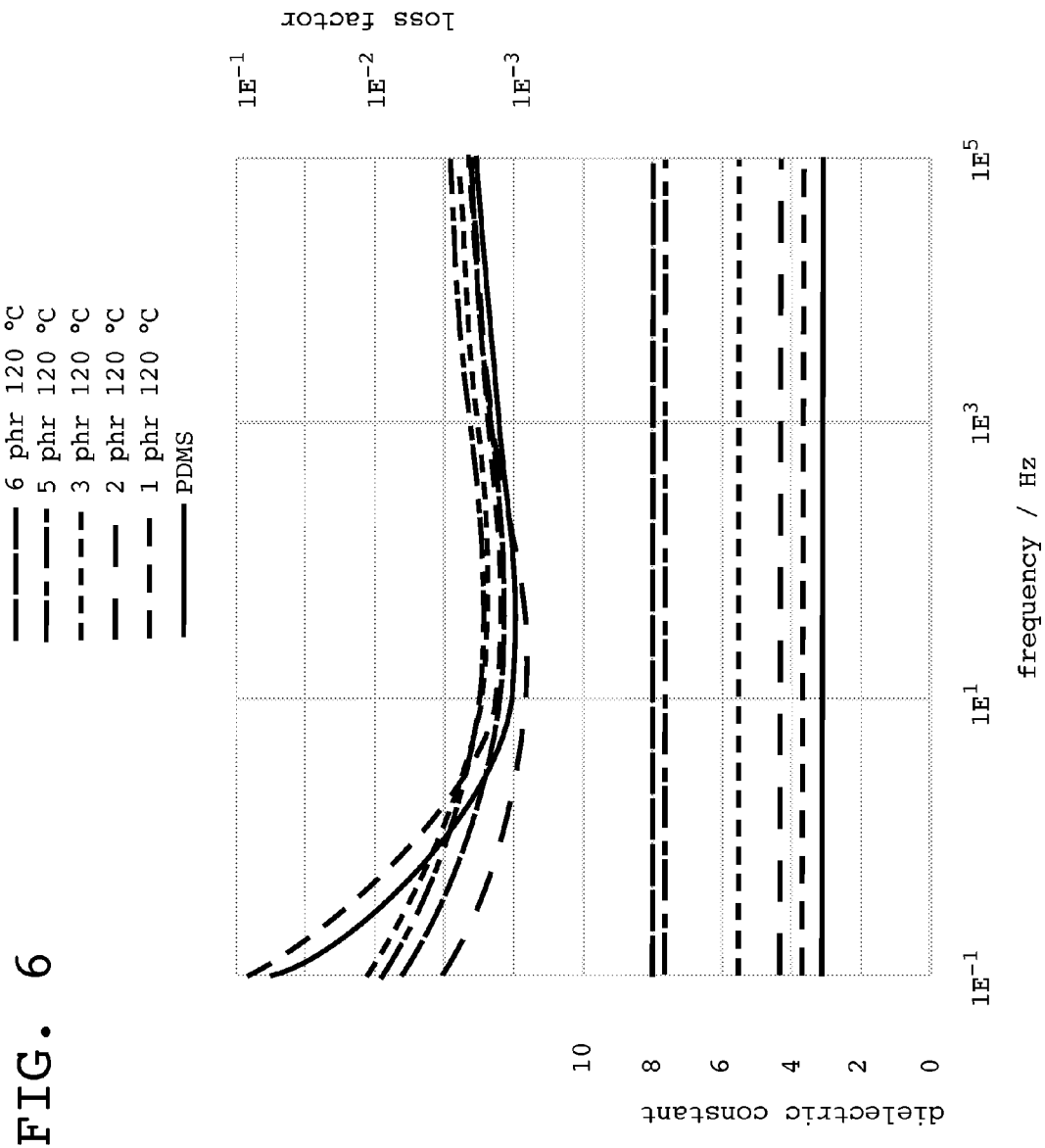
FIGS. 6 and 7 show plots of the dielectric constants and loss factors of reduced graphene oxide composites according to various embodiments of the invention.

In some embodiments of the invention, GO composite materials provide capacitive field grading effects due to their increased dielectric constant. For example, FIG. 6 shows a plot of both the dielectric constants and loss factors as a function of frequency for composite materials according to several embodiments of the invention. As can be seen in FIG. 6, dielectric constant increased from about 3 for neat PDMS to 8 for the 6 phr 120° C. composite. Such a large increase in dielectric constant is surprising, given the relatively low volume fraction of the reduced GO.

At the same time, the loss factor of the composite materials increased only modestly, from about 0.001 to about 0.003 at 100 Hz for the 5 phr 120° C. composite. For a 6 phr sample, the dielectric constant increased to 8 and the loss factor is below 0.005. Intrinsic barriers of GO limit leakage current at low voltage, while the conductive regions where surface groups are absent can still provide the increased dielectric constant benefits observed.

Figure 7:
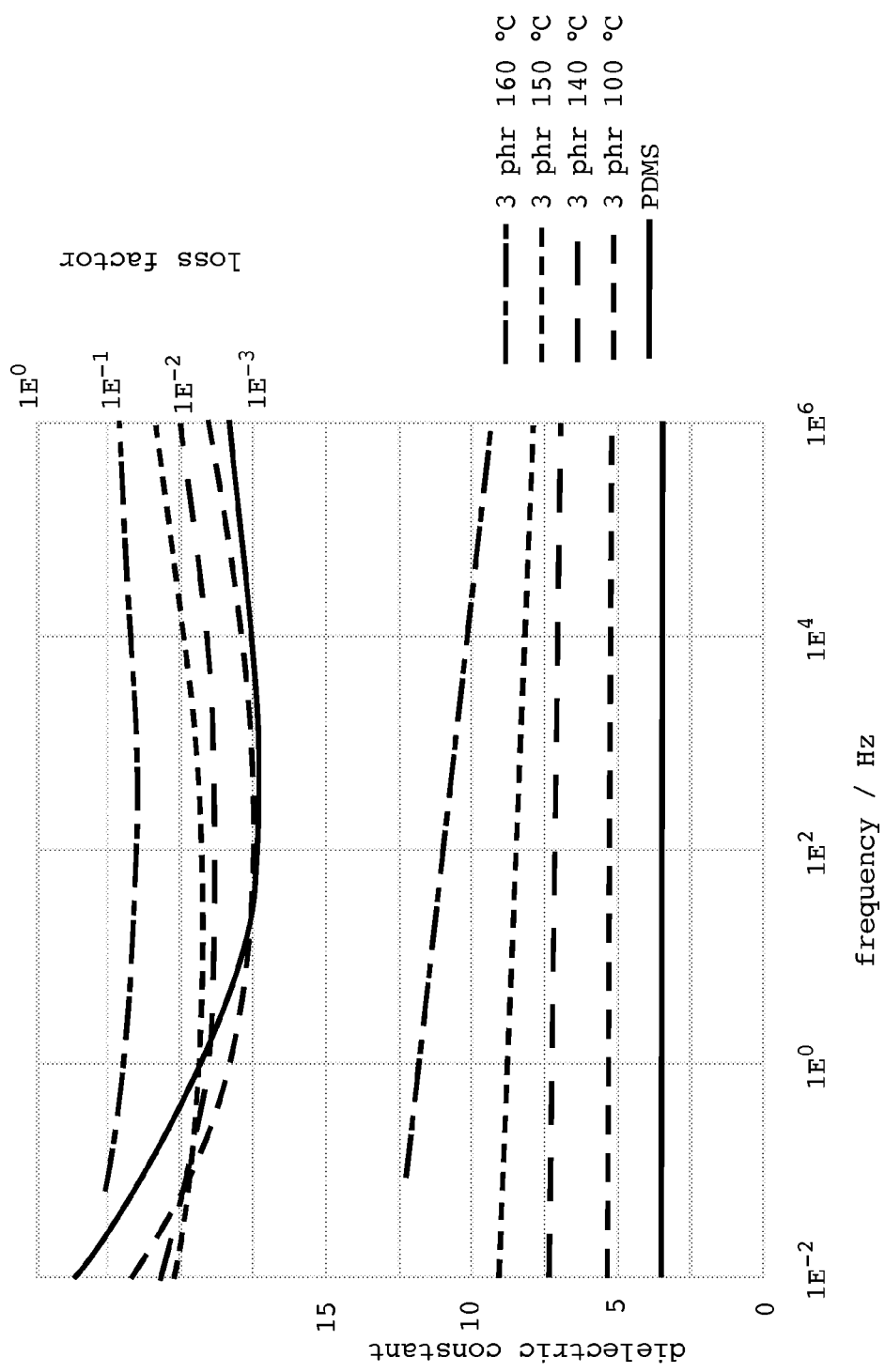

FIG. 7 shows the effect of GO oxidation state on the dielectric constant of composite materials according to various embodiments of the invention. As temperature is increased, and reduction correspondingly increases, additional surface groups are removed, leading to larger conductive areas between insulating areas. This increases the effective aspect ratio of the GO, resulting in increases in both dielectric constant and loss factor. The slope of the loss factor curves is close to zero at frequencies above 1 Hz, indicative of the major contributors to the loss being bipolar or interfacial relaxation processes rather than leakage current. The lack of leakage current indicates that the GO has good insulating properties even after reduction at 160° C.

Accordingly, GO, reduced GO, or both, may be employed in composite materials exhibiting non-linear conductivity/ resistivity. Such composite materials are useful as field grading materials, which may, according to some embodiments of the invention, be tuned by selective reduction to obtain desirable or useful electrical properties.

Embodiments of the present invention further relate to the use of a composite material as a field grading material. In addition, some embodiments of the present invention relate to the use of the composite material as an electric insulating material in medium or high voltage cable systems, such as cable insulation, joints and terminations; machines bushings, generators, instrument transformers and capacitors.

Some of the advantages with the present invention is to prevent heat generation and failure at working voltage, good control of thermal runaway and a larger breakdown strength, switching field and conductivity can be adjusted by filler loading and reduction state in a certain range for different field grading application. In addition, the increased dielectric constant of the composites leads to an additional capacitive field grading effect.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method of reducing electric field stress at a joint or termination of an electric cable, the method comprising:
    applying to the joint or termination a field grading material, the field grading material comprising reduced graphene oxide, distributed within a polymer material.

2. The method of claim 1, wherein the field grading material exhibits non-linear resistivity.

3. The method of claim 1, wherein the field grading material includes thermally-reduced graphene oxide reduced at a temperature between about 70° C. and about 160° C.

4. The method of claim 1, wherein the polymer material includes at least one polymer material selected from a group consisting of: natural rubbers, silicone, poly(dimethyl siloxane), ethylene propylene diene rubber, ethylene propylene rubber, epoxy, polyester, polyesterimide, and polyamidimide.

5. A method of preparing a graphene oxide polymer material, the method comprising:
    thermally reducing a quantity of graphene oxide by increasing an ambient temperature of an atmosphere containing the quantity of graphene oxide to between about 70° C. and about 160° C.;
    admixing the thermally-reduced quantity of graphene oxide with at least one polymer material; and
    curing the admixture.

6. The method of claim 5, wherein the thermally-reduced graphene oxide is admixed with the at least one polymer material at a concentration between about 2 parts and about 5 parts per hundred parts of the at least one polymer material.

7. The method of claim 5, wherein the at least one polymer material is selected from a group consisting of: natural rubbers, silicone, such as poly(dimethyl siloxane), EPDM rubber (ethylene propylene diene rubber), EPR (ethylene propylene rubber), epoxy, polyester, polyesterimide, and PAI (polyamidimide).

8. A graphene oxide polymer material prepared according to the method of claim 5.

9. A field grading material exhibiting non-linear resistivity comprising a quantity of reduced graphene oxide distributed within at least one polymer material.

10. The field grading material of claim 9, wherein the at least one polymer material is selected from a group consisting of: natural rubbers, silicone, poly(dimethyl siloxane), ethylene propylene diene rubber, ethylene propylene rubber, epoxy, polyester, polyesterimide, and polyamidmide.

11. The field grading material of claim 9, wherein the reduced graphene oxide has a concentration greater than about 2 parts per hundred parts of polymer.

12. The field grading material of claim 11, wherein the reduced graphene oxide has a concentration between about 3 parts and about 5 parts per hundred parts of polymer.

* * * * *